United States Patent
Groß et al.

(10) Patent No.: US 12,502,932 B2
(45) Date of Patent: Dec. 23, 2025

(54) METHOD FOR THE THERMAL PRE-CONDITIONING OF A VEHICLE, SYSTEM, COMPUTER PROGRAM

(71) Applicant: Dr. Ing. h.c. F. Porsche Aktiengesellschaft, Stuttgart (DE)

(72) Inventors: Manuel Groß, Hessigheim (DE); Christoph Siegmund Bara, Prague (CZ); Domenica Fresca, Renningen-Malmsheim (DE); Jens Niewöhner, Wiernsheim (DE); Patrick Böhl, Wendlingen am Neckar (DE); Marcel Straub, Kornwestheim (DE); Stefano Ruberto, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 306 days.

(21) Appl. No.: 18/143,160

(22) Filed: May 4, 2023

(65) Prior Publication Data
US 2023/0356563 A1 Nov. 9, 2023

(30) Foreign Application Priority Data
May 5, 2022 (DE) .................. 10 2022 111 068.0

(51) Int. Cl.
*B60H 1/00* (2006.01)
*B60R 13/08* (2006.01)
*H02J 7/00* (2006.01)

(52) U.S. Cl.
CPC ..... *B60H 1/00892* (2013.01); *B60H 1/00385* (2013.01); *B60R 13/0815* (2013.01); *H02J 7/00* (2013.01)

(58) Field of Classification Search
CPC ........... B60H 1/00892; B60H 1/00385; B60R 13/0815; H02J 7/00
See application file for complete search history.

(56) References Cited

U.S. PATENT DOCUMENTS

| | | | |
|---|---|---|---|
| 9,308,911 B2 | 4/2016 | Kohlberger et al. | |
| 11,231,101 B2 | 1/2022 | Graf | |
| 2013/0193932 A1 | 8/2013 | Schalli | |
| 2014/0326430 A1* | 11/2014 | Carpenter | B60H 1/00278 165/41 |
| 2017/0232865 A1* | 8/2017 | Christen | B60H 1/00278 429/120 |
| 2022/0123384 A1* | 4/2022 | Graubmann | H01M 10/6552 |

FOREIGN PATENT DOCUMENTS

| | | | | |
|---|---|---|---|---|
| DE | 102010021028 A1 | 11/2011 | | |
| DE | 102011086569 A1 | 5/2013 | | |
| DE | 102012223054 A1 * | 6/2013 | .......... | H01M 10/486 |
| DE | 102016207912 A1 | 11/2017 | | |
| EP | 3832749 A1 * | 6/2021 | ............... | B60K 1/04 |

OTHER PUBLICATIONS

DE 102012223054 A1 translated doc (Year: 2013).*

\* cited by examiner

*Primary Examiner* — James J Lee
*Assistant Examiner* — Brandon S Lee
(74) *Attorney, Agent, or Firm* — Buchanan Ingersoll & Rooney PC

(57) ABSTRACT

A method for the thermal pre-conditioning of a vehicle having an electric drive unit and an electrical energy reservoir. The method includes at least the following step: the thermal pre-conditioning of a component of the vehicle while the electrical energy reservoir of the vehicle is connected to the external electrical energy supply.

20 Claims, 1 Drawing Sheet

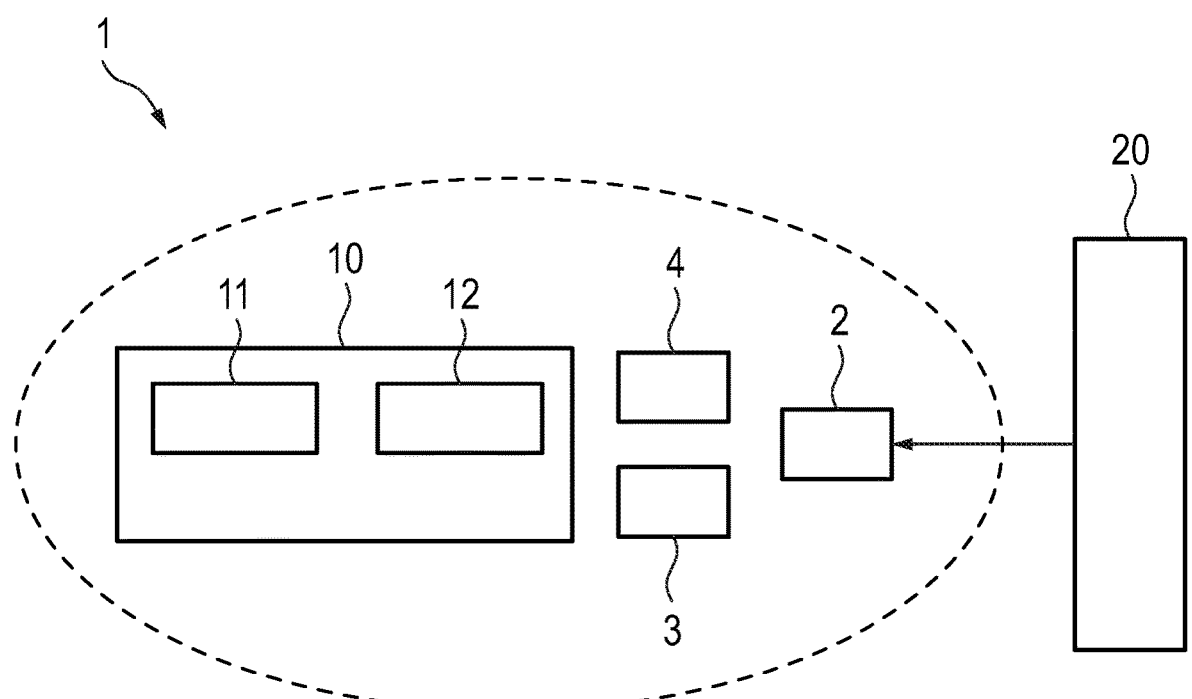

METHOD FOR THE THERMAL PRE-CONDITIONING OF A VEHICLE, SYSTEM, COMPUTER PROGRAM

CROSS-REFERENCE TO RELATED APPLICATION

This application claims priority to German Patent Application No. 10 2022 111 068.0, filed May 5, 2022, the content of such application being incorporated by reference herein in its entirety.

FIELD OF THE INVENTION

The invention relates to a method for the thermal pre-conditioning of a vehicle, wherein the vehicle comprises an electric drive unit having an electrical energy reservoir. Furthermore, the invention relates to a system for the thermal pre-conditioning of a vehicle and a computer program.

BACKGROUND OF THE INVENTION

Both battery electric vehicles (BEV, Battery Electric Vehicles) and hybrid vehicles having both battery electric and internal combustion engine drive trains (PHEV, Plug-In Hybrid Electric Vehicles) having an electrical charging capability are well known. In such vehicles, while idling prior to driving (preferably in the event of a charging operation), the vehicle cabin and the high-voltage battery (HVB) can be thermally pre-conditioned to their respective ideal operating temperature. An ideal temperature of approximately 22° C. to 25° C. typically applies for the vehicle cabin, depending on the ambient temperature. An ideal temperature window of 20° C. to 30° C. often applies for the high-voltage battery. If the vehicle is connected to an electrical power source during pre-conditioning, the power required for pre-conditioning can be supplied by the power source and need not be withdrawn from the high-voltage battery at the start of the journey. This increases the usable electrical range of the vehicle. In modern BEVs, such functions are possible and are partially carried out automatically by the vehicle (e.g. by specifying a departure time).

The high-voltage battery of BEVs and PHEVs is, to a certain extent, a limiting component for these vehicles. Due to its specific energy density, it takes up a relatively large amount of design space in the vehicle and has a high weight, which adversely affects the efficiency of the entire vehicle. It is also a high cost factor. By contrast, the benefit is a high electrical vehicle range and performance capability (acceleration and fast charging capability). A limiting factor is the service life of the high-voltage battery.

In order to maximize the above-mentioned benefits, various approaches are pursued.

On the one hand, an increase in battery capacity is conceivable. However, this is typically comparatively expensive and disadvantageously increases the weight as well as the design space requirements.

Further, an increase in overall vehicle efficiency is conceivable. Again, this is typically costly and quickly reaches technical and practical limits for a variety of parts and functions of the vehicle.

Furthermore, a reduction of the requirements of the components is conceivable, for example an extension of the ideal temperature window of the high-voltage battery. However, this flexibility is also limited by technical and material-specific requirements, and improvements are typically costly.

Furthermore, the addition of further energy reservoirs is conceivable. However, this also increases costs and leads to additional weight and space requirements.

SUMMARY OF THE INVENTION

In light of the foregoing, described herein is a method and/or a system with which the battery electric range of a vehicle can be advantageously increased.

To solve the problem, a method for the thermal pre-conditioning of a vehicle is proposed, wherein the vehicle comprises an electric drive unit, and wherein the vehicle comprises an electrical energy reservoir,
  wherein the method comprises at least the following step:
    (a) the thermal pre-conditioning of a component of the vehicle while the electrical energy reservoir of the vehicle is connected to the external electrical energy supply.

According to the present invention, an advantageous thermal pre-conditioning of a component of the vehicle can be carried out as a result. The thermal energy stored in this way can be drawn on during operation of the vehicle, in particular while driving the vehicle, thus discharging the electrical energy reservoir. The range of the vehicle, i.e. the battery electric range, that can be achieved by means of the electrical energy reservoir system can thereby be increased.

It is conceivable that the component can comprise one or more parts or components. For example, it is possible for multiple parts or components of the vehicle to be thermally pre-conditioned in step (a).

According to an embodiment of the present invention, it is provided that a component of the vehicle is thermally pre-conditioned prior to the start of driving—in particular during the charging process and/or rapid charging process of the vehicle's electrical energy reservoir and while the vehicle is connected to an electrical power source. The thermal pre-conditioning can also be understood as the storage of thermal energy. For pre-conditioning, advantageously (but not exclusively) components are provided that are already part of the vehicle, in particular parts of the shell structure, the body, and/or the electric drive unit. After the start of driving, the thermal energy stored in this way can be used in order to meet the thermal requirements of the vehicle cabin and the high-voltage battery.

The electrical energy reservoir is preferably configured so as to supply power to the electric drive unit during operation of the vehicle. For this purpose, the electrical energy reservoir, preferably in the idling state of the vehicle, can be recharged by means of an external electrical power supply, for example a charging station.

The electrical energy reservoir preferably comprises a high voltage battery (HVB) of the vehicle. It is conceivable that the electrical energy reservoir can be formed by one or more high-voltage batteries.

It is preferably possible that the component of the vehicle that is thermally pre-conditioned in step (a) is in particular not a part of the electrical energy reservoir (i.e. in particular not the HBV of the vehicle) and in particular not a part of the vehicle cabin of the vehicle. Thus, according to the present invention, in particular, a thermal pre-conditioning of components of the vehicle beyond the high-voltage battery and the vehicle cabin of the vehicle is possible.

According to an advantageous configuration, it is provided that the thermal pre-conditioning of the component in step (a) is carried out by means of the external electrical power supply, preferably wherein thermal pre-conditioning includes a heating or cooling the component of the vehicle. Preferably, electrical energy is provided by the external electrical energy supply, which is converted into thermal energy during the thermal pre-conditioning of the component and is stored as thermal energy by the component. It is conceivable, for example, that the component is heated to a temperature that is above the optimal temperature window of the vehicle cabin, in particular above 25° C. It is conceivable, for example, that the component is cooled to a temperature that is below the optimal temperature window of the vehicle cabin, in particular below 22° C. Other temperatures are also conceivable.

According to an advantageous configuration, it is provided that the component comprises a body part of the vehicle and/or a shell component of the vehicle and/or a part of the electric drive unit of the vehicle. It is conceivable in particular that the component can be configured as a body part and/or a shell component and/or part of the electric drive unit of the vehicle. It is conceivable that the component is a component of the vehicle that is already present as a part of the vehicle, i.e. has a primary function other than the storage of thermal energy. It is alternatively conceivable that the component is a component installed in the vehicle specifically for thermal pre-conditioning.

According to an embodiment of the present invention, it is possible that the thermal pre-conditioning of the component of the vehicle by means of the external electrical power supply occurs while the vehicle is in a charging position,
preferably wherein the thermal pre-conditioning of the component of the vehicle during a charging of the electrical energy reservoir occurs by means of the external electrical power supply. The thermal pre-conditioning is thus preferably carried out in the idling state of the vehicle, while the electrical energy reservoir of the vehicle is charged by an external power source, for example a charging station.

According to an embodiment of the present invention, it is preferably conceivable that the thermal pre-conditioning of component is thermally insulated, in particular against an environment of the component and/or adjacent further components, in order to suffer as little loss as possible to the environment and/or to the adjacent further components. This makes a particularly advantageous storage of thermal energy in the component possible.

According to an advantageous configuration of the present invention,
it is provided that the component of the vehicle is configured as a shell component of the vehicle, wherein, in addition to the shell component, a shell structure of the vehicle comprises a further shell component, wherein the shell is thermally insulated against the further shell component by means of a thermal insulation; and/or—
that the component of the vehicle is configured as a body part of the vehicle, wherein, in addition to the body part, a body of the vehicle comprises a further body part, wherein the body part is thermally insulated against the further body part by means of a thermal insulation. The further shell component and/or the further body component are preferably not thermally conditioned during the method for thermally conditioning the vehicle, i.e. in particular not actively heated and/or cooled.

Advantageously, according to one embodiment of the present invention, it is conceivable that the component (or components or parts thereof) is connected to the thermal management of the vehicle. For example, the component (or its components or parts) is perfused with cooling water from the cooling circuit in order to selectively extract and use the thermal energy stored in the component in step a), in particular while driving the vehicle.

According to an advantageous configuration, it is provided that the vehicle comprises a heating and/or cooling system, wherein the thermal pre-conditioning of the component is carried out by means of the heating and/or cooling system, preferably such that during the thermal pre-conditioning of the component, the heating and/or cooling system is fed through the electrical energy reservoir and/or the external electrical energy supply in such a way that the component is thermally pre-conditioned by the heating and/or cooling system. In particular, it is conceivable that the heating and/or cooling system can comprise one or more heating and/or coolant lines configured as part of the component. By means of these heating and/or coolant lines, heating and/or coolant, for example water, can be guided through the component, thereby allowing the component to be temperature-controlled. Further, by means of the heating and/or cooling system, in particular by means of the heating and/or coolant lines of the component, thermal energy stored in step (a) in the component can be dissipated from the component in step (b).

According to an advantageous configuration, it is conceivable that the method further comprises:
(b) temperature-controlling, in particular heating or cooling, a vehicle cabin of the vehicle and/or of the electrical energy reservoir of the vehicle by means of the thermally pre-conditioned component, preferably during an operation of the vehicle and/or while driving the vehicle. Step (b) is preferably performed after step (a). In particular, it is therefore preferably conceivable that thermal energy is stored in the component by the thermal pre-conditioning of the component (in step (a)), wherein the energy of the component thus stored is used in step (b) for temperature-controlling, in particular for heating or cooling, a vehicle cabin of the vehicle and/or the electrical energy reservoir of the vehicle. As a result, the vehicle cabin and/or the electrical energy reservoir of the vehicle can be held at its respective optimal temperature windows during driving, wherein the energy expended for this purpose can be at least partially provided by the thermally pre-conditioned component. For example, the vehicle cabin is thereby kept in a temperature window of 22° C. to 25° C. during driving, and the electrical energy reservoir is kept in a temperature window of 20° C. to 30° C.

According to an advantageous configuration, it is conceivable that the component comprises a shell component of the shell structure of the vehicle. This shell component is connected to the rest of the shell by means of a thermally insulating or thermally poorly conductive material, for example a carbon composite material. Additionally or alternatively, this shell component of the shell structure can comprise a thermal insulation. As a result, thermal bridges are advantageously avoided. This shell component of the shell structure preferably has channels that are perfused by coolant. By advantageously connecting these channels to the cooling circuit of the vehicle, thermal energy can be stored and dissipated via the flowing coolant. Due to the thermal insulation and the avoidance of thermal bridges, the thermal losses of this shell component of the shell structure are minimal. For example, it is conceivable that this shell component of the shell is pre-cooled during the charging process, preferably during a particular season, particularly in summer, and/or during a defined period of time. After the start of driving, this shell component of the shell structure can then be used in order to cool cooling water, which can in turn be used in order to cool the high-voltage battery of the vehicle. It is alternatively or additionally conceivable, for example, that this shell component of the shell structure is pre-heated during the charging process, preferably during a particular further season, particularly in winter, and/or during a defined further period of time. Particularly advantageous here is the use of waste heat generated, for example, in the high-voltage battery and/or in further electrical aggregates during the charging process, which must typically be dissipated anyway. After the start of driving, this shell component of the shell structure can then be used in order to heat cooling water and thus heat the vehicle cabin or the high-voltage battery. Alternatively or additionally, it is conceivable that a vehicle mass can be connected to the component by means of thermal conduction, thereby enabling a conditioning of vehicle masses.

It is thus possible to increase the effectively usable electrical range of a vehicle in both summer and (particularly advantageously) winter. In a particularly advantageous manner, in particular in the winter case, the waste heat that is generated anyway can be used during the charging process, which is otherwise usually dissipated to the surrounding environment unused. According to a particularly advantageous configuration of the present invention, it is conceivable that energy is automatically stored by a thermal management of the vehicle or as a function of a selection or setting by a user of the vehicle by means of the method according to aspects of the invention.

A further subject matter of the invention is a system for the thermal pre-conditioning of a vehicle, wherein the vehicle comprises an electric drive unit and wherein the vehicle comprises an electric energy reservoir, wherein the system is configured so as to perform a method according to any one of the claims.

According to an advantageous configuration, in particular of the system according aspects of to the invention, it is provided that the system comprises computer means, wherein, for controlling the external electrical power supply and/or the vehicle, in particular the electrical energy reservoir and/or the heating and/or cooling system of the vehicle, the computer means are configured such that a method according to an embodiment of the present invention is performed.

It is conceivable that the computer means can be partially or completely configured as part of the vehicle and/or that the computer means can be partially or completely configured externally from the vehicle.

A further subject matter of the invention is a computer program comprising instructions that, when executed by computer means, cause the computer program to perform a method according to an embodiment of the present invention. For example, the computer program is storable on a storage medium.

For the system according to aspects of the invention and the computer program according to the aspects of invention, the features, embodiments, and advantages described in connection with the method according to aspects of the invention or in connection with an embodiment of the method according to aspects of the invention are applicable. For the method according to aspects of the invention and the computer program according to aspects of the invention, the features, embodiments, and advantages described in connection with the system according to aspects of the invention or in connection with an embodiment of the system according to aspects of the invention are applicable.

BRIEF DESCRIPTION OF THE DRAWINGS

Further advantages and details of the invention will be explained in the following with reference to the embodiment example shown in the drawing.

FIG. 1 is a schematic view of a vehicle according to an embodiment example of the present invention.

DETAILED DESCRIPTION OF THE INVENTION

In particular, the vehicle 1 depicted schematically in FIG. 1 is a battery electric vehicle (BEV) or a plug-in hybrid electric vehicle (PHEV) comprising both a battery electric and an internal combustion engine drive train. The vehicle 1 thus comprises an electric drive unit 3 and an electrical energy reservoir 2, in particular a high-voltage battery. The vehicle is shown in FIG. 1 in a charging position, in which the energy reservoir 2 is charged by an external electrical power supply 20, for example a charging station or charging column. A cable connection between the vehicle 1 and the external electrical power supply 20 is typically configured for charging the electrical energy reservoir 2. While the electrical energy reservoir 2 of the vehicle 1 is connected to the external electrical energy supply 20, a component 11 of the vehicle 1 is thermally pre-conditioned, in particular heated or cooled. In this way, thermal energy is stored by means of the component 11. In the illustrated embodiment, the component 11 is part of the body and/or the shell 10 of the vehicle. Alternatively, it is possible for the component to be part of the electric drive train or the drive unit 3, for example. The thermal pre-conditioning of the component 11 is carried out, for example, by means of a heating and/or cooling system 4 of the vehicle 1. In this case, the component 10 comprises one or more heating and/or coolant lines. By means of these heating and/or coolant lines, heating and/or coolant can be guided through the component 11, thereby allowing the component 11 to be temperature-controlled. The electrical energy required by the heating and/or cooling system 4 is provided in particular by the external electrical power supply 20.

The thermal energy stored in the component 11 during the thermal pre-conditioning of the component 11 can then later be dissipated from the component 11 during operation of the vehicle 1, in particular while driving the vehicle 1 (preferably also by means of the heating and/or cooling system 4) and, for example, used in order to set a desired temperature of the vehicle cabin of the vehicle 1 or the electric energy reservoir 2 while driving. This can conserve electrical energy of electrical energy reservoir 2 and increase the range of the vehicle 1.

In a particularly advantageous manner, it is possible that the component 11, which stores thermal energy from the thermal pre-conditioning, is thermally insulated against one or more further components 12, for example adjacent components 12, and/or comprises a thermal insulation for these further components 12. The storage time of the thermal energy in the component 11 can thereby be increased, because the losses are reduced with further components 12.

Alternatively or in addition to the use of the heating and/or cooling system 4 for the thermal pre-conditioning of the component 11, it is possible that the component 11 is thermally pre-conditioned, in particular heated, during the thermal pre-conditioning by waste heat generated during the charging of the electrical energy reservoir 2. Waste heat, which typically arises anyway when a high-voltage battery is charged, can thereby be advantageously utilized.

LIST OF REFERENCE NUMBERS

1 Vehicle
2 Electrical energy reservoir
3 Electric drive unit
4 Heating and/or cooling system
10 Body and/or shell
11 Component
12 Further component
20 External electrical power supply

What is claimed is:

1. A method for thermal pre-conditioning a vehicle having an electric drive unit, an electrical energy reservoir and a component that is configured to store thermal energy, wherein the method comprises the steps of:
    thermally pre-conditioning the component of the vehicle by heating or cooling the component while the electrical energy reservoir of the vehicle is connected to an external electrical energy supply; and
    transferring the stored thermal energy from the thermally pre-conditioned component to either an interior compartment of the vehicle or the electrical energy reservoir during operation of the vehicle and while the vehicle is disconnected from the external electrical energy supply,
    wherein the component has a primary function other than the storage of thermal energy.

2. The method according to claim 1, wherein the thermal pre-conditioning of the component is carried out by the external electrical power supply.

3. The method according to claim 1, wherein the component comprises a body part of the vehicle and/or a shell of the vehicle and/or a part of the electric drive unit of the vehicle.

4. The method according to claim 1, wherein the thermal pre-conditioning of the component of the vehicle by the external electrical power supply occurs while the vehicle is in a charging position.

5. The method according to claim 1, wherein the thermal pre-conditioning of the component of the vehicle during a charging of the electrical energy reservoir occurs by means of the external electrical power supply.

6. The method according to claim 1,
    wherein the component of the vehicle is configured as a shell component of the vehicle, wherein, in addition to the shell component, a shell structure of the vehicle comprises a further shell component, wherein the shell is thermally insulated against the further shell component by a thermal insulation; and/or
    wherein the component of the vehicle is configured as a body part of the vehicle, wherein, in addition to the body part, a body of the vehicle comprises a further body part, wherein the body part is thermally insulated against the further body part by a thermal insulation.

7. The method according to claim 1, wherein the vehicle comprises a heating and/or cooling system, wherein the thermal pre-conditioning of the component is carried out by the heating and/or cooling system such that during the thermal pre-conditioning of the component, the heating and/or cooling system is fed through the electrical energy reservoir and/or the external electrical energy supply in such a way that the component is thermally pre-conditioned by the heating and/or cooling system.

8. The method according to claim 1, wherein the method further comprises:
    either heating or cooling a vehicle cabin of the vehicle and/or of the electrical energy reservoir of the vehicle by means of the thermally pre-conditioned component during an operation of the vehicle and/or while driving the vehicle.

9. The method of claim 1, wherein the component does not form part of the electric energy reservoir.

10. The method of claim 1, wherein the component includes channels through which a fluid can pass for transferring thermal energy from the component to a cooling circuit of the vehicle.

11. A system for the thermal pre-conditioning of a vehicle having an electric drive unit, an electric energy reservoir and a component that is configured to store thermal energy, wherein the system is configured for:
    thermally pre-conditioning the component of the vehicle by heating or cooling the component while the electrical energy reservoir of the vehicle is connected to an external electrical energy supply; and
    transferring the stored thermal energy from the thermally pre-conditioned component to either an interior compartment of the vehicle or the electrical energy reservoir during operation of the vehicle and while the vehicle is disconnected from the external electrical energy supply,
    wherein the component has a primary function other than the storage of thermal energy.

12. The vehicle comprising the electric drive unit, the electric energy reservoir, and the system of claim 11.

13. The system of claim 11, wherein the stored thermal energy from the thermally pre-conditioned component is transferred to the interior compartment of the vehicle during operation of the vehicle and while the vehicle is disconnected from the external electrical energy supply.

14. The system of claim 11, wherein the component comprises a thermally insulated shell of the vehicle.

15. The system of claim 11, wherein the component does not form part of the electric energy reservoir.

16. The system of claim 11, wherein the component includes channels through which a fluid can pass for transferring thermal energy from the component to a cooling circuit of the vehicle.

17. A non-transitory machine-readable storage medium storing a computer program configured to carry out a method in a vehicle having an electric drive unit, an electric energy reservoir and a component that is configured to store thermal energy, the method comprising the steps of:
    thermal pre-conditioning the component of a vehicle by heating or cooling the component while the electrical energy reservoir of the vehicle is connected to an external electrical energy supply, and
    transferring the stored thermal energy from the thermally pre-conditioned component to either an interior compartment of the vehicle or the electrical energy reservoir during operation of the vehicle and while the vehicle is disconnected from the external electrical energy supply,
    wherein the component has a primary function other than the storage of thermal energy.

18. The non-transitory machine-readable storage medium of claim 17, wherein the stored thermal energy from the thermally pre-conditioned component is transferred to the interior compartment of the vehicle during operation of the vehicle and while the vehicle is disconnected from the external electrical energy supply.

19. The non-transitory machine-readable storage medium of claim 17, wherein the component comprises a thermally insulated shell of the vehicle.

20. The non-transitory machine-readable storage medium of claim 17, wherein the component does not form part of the electric energy reservoir.

\* \* \* \* \*